Sept. 8, 1964 J. S. FINGER 3,147,820
ACOUSTICAL PANEL UNIT WITH POROUS RESINOUS FACING
Original Filed Jan. 25, 1955 2 Sheets-Sheet 1
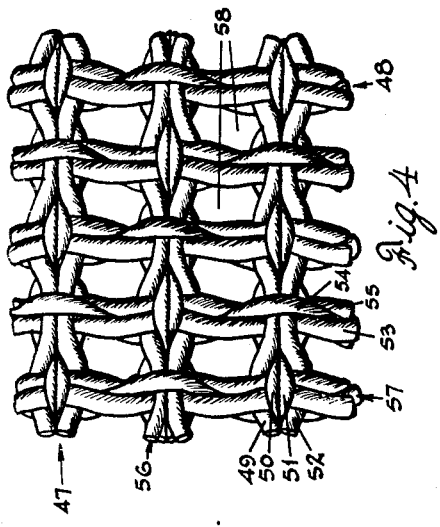
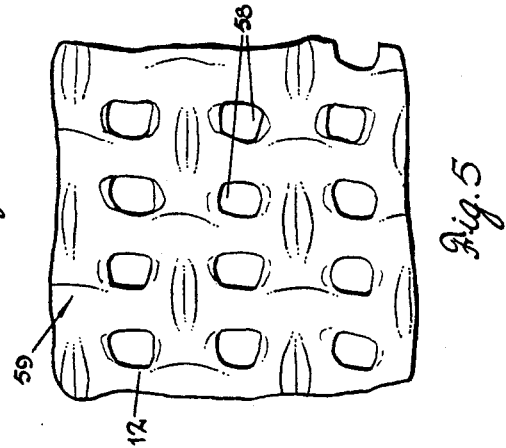
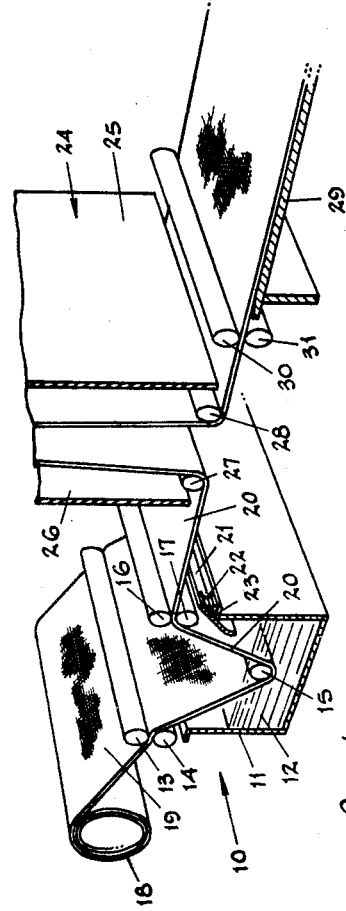
INVENTOR.
Joseph S. Finger
BY John N. McKinney
ATTORNEYS Sept. 8, 1964 J. S. FINGER 3,147,820
ACOUSTICAL PANEL UNIT WITH POROUS RESINOUS FACING
Original Filed Jan. 25, 1955 2 Sheets-Sheet 2

INVENTOR.
JOSEPH S. FINGER
BY
John R. McKinney
ATTORNEY

United States Patent Office 3,147,820
Patented Sept. 8, 1964

3,147,820
ACOUSTICAL PANEL UNIT WITH POROUS RESINOUS FACING
Joseph S. Finger, Bellaire, Tex., assignor to Johns-Manville Corporation, New York, N.Y., a corporation of New York
Original application Jan. 25, 1955, Ser. No. 484,026. Divided and this application Dec. 29, 1959, Ser. No. 862,618
3 Claims. (Cl. 181—33)

This invention relates broadly to panel products. More specifically, this invention relates to panel products comprised of a woven fibrous core impregnated with a synthetic resin in a particular manner. Still more specifically this invention relates to porous panel products comprised of a woven fibrous core impregnated with a synthetic resin, which products are characterized by utility and by a novel decorative appearance. This application is a division of copending application Serial No. 484,026, filed January 25, 1955, now abandoned.

Panels made in the form of substantially rigid synthetic resin sheets provided with a reinforcement of random fiber mat have found use in domestic and industrial application. These products have been employed to fabricate awnings, skylights, exterior panels, non-load bearing partitions and others.

Such panels are currently produced by imbedding a random fiber mat in a body of liquid thermosetting resin and then curing the resin to provide substantially rigid and highly weather resistant products. While present products have good utility characteristics as regards weather resistance, light diffusion characteristics, etc., the non-uniform arrangement of the fibrous core has left something to be desired as concerns appearance of the panels, especially where the panels are utilized in interior decoration applications. Furthermore, present panels are of continuous structure, i.e., are non-porous, and accordingly their use is limited, particularly where good acoustical properties are desired.

It is therefore an important object of the present invention to provide panel products adapted to interior decorative and sound conditioning uses.

A further object of the present invention is to provide colorful and decorative panels adapted to provide both functional utility and aesthetic appeal.

A still further object is to provide panel products comprised of a woven fibrous core impregnated with a synthetic resin in a particular manner, wherein the fibrous core functions to lend both strength and a pleasing decorative appearance to the product.

Another object is to provide a panel product comprised of a woven fibrous core impregnated with a synthetic resin in a particular manner, wherein the fibrous core is the primary component and thereby lends flexibility and porosity to the product.

Another object of the present invention is to provide a panel product comprised of a woven fibrous core impregnated with a synthetic resin in a particular manner, wherein the fibrous core is of open weave construction to thereby provide a foraminous product.

Other objects and advantages of the invention will become more apparent during the course of the following description when taken in connection with the accompanying drawings.

In the drawings wherein like numerals are employed to designate like parts throughout the same:

FIG. 1 is a partial perspective view of an apparatus adapted to the preparation of panel products in accordance with the present invention;

FIG. 2 is a perspective view of apparatus adapted to cure panels made by the apparatus of FIG. 1, and showing a mold adapted to form corrugated products;

FIG. 3 is a partial transverse sectional view of the mold illustrated in FIG. 2;

FIG. 4 is a plan view, enlarged four times, of a preferred form of woven material employed in the present invention;

FIG. 5 is a plan view, enlarged four times, of a panel made according to the present invention;

Figure 6:
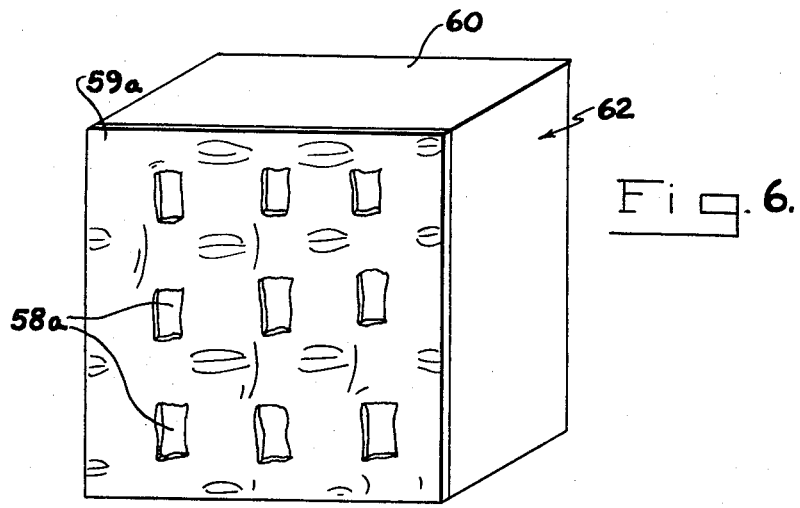
FIG. 6 is an enlarged pictorial representation of a typical acoustical unit having a facing cover comprised of a panel formed according to the present invention.

With reference now to the drawings and particularly to FIG. 1, numeral 10 indicates part of an apparatus employed to produce the products of the present invention. Apparatus 10 includes a tank 11 adapted to contain a quantity of liquid resin 12. A pair of feed rolls 13 and 14 are rotatably journaled at the entry side of tank 11. Rolls 13 and 14 are vertically spaced with their axes in horizontal alignment and are in peripheral contact with each other. A roll 15, having its axis parallel to the axes of rolls 13 and 14 is rotatably journaled near the bottom of tank 11 so that it is submerged in the bath of resin 12. A pair of wringer rolls 16 and 17 are rotatably journaled at the outlet side of tank 11 and are vertically spaced one above the other with their axes horizontally aligned. Rolls 16 and 17 are in peripheral contact in the manner of rolls 13 and 14.

A roll of woven cloth 18 is suitably supported adjacent the entry of tank 11, with its axis parallel to the axes of rolls 13, 14, 15 and 17 in order that the cloth 19 can be paid out and fed between rolls 13 and 14 in a continuous manner. From rolls 13 and 14, the cloth 19 passes into the bath of resin 12, beneath roll 15 where it becomes saturated with resin. The impregnated cloth 20 then proceeds up between rolls 16 and 17 and continues on to other processing apparatus to be subsequently described. A drip strip 21 is positioned above the edge of tank 11. Angle iron brackets 22 are welded to the edge 23 of tank 11 and to the underneath side of drip strip 21, to hold the drip strip in position. Thus excess resin 12, removed from the impregnated cloth 20 by the wringer rolls 16 and 17, is caught and returned to tank 11.

At 24 there is designated generally a drying tower including walls 25 and 26; one wall being omitted from the drawing for clarity. Rolls 27 and 28 are rotatably journaled at the bottom of tower 24 and are positioned at the front and rear sides of the bottom of the tower. Rolls 27 and 28 are horizontally disposed with their axes parallel to each other and to the axes of rolls 16 and 17. A third tower roll (not shown) is rotatably journaled at the top of tower 24. The impregnated cloth 20 is passed beneath roll 27, up through tower 24 and around the top roll and back down and under roll 28 for exit from the tower. Suitable heating means (not shown) and an exhaust duct (not shown) are provided in tower 24 to remove the solvent from the resin contained in cloth 20.

At 29 there is indicated a cutting table. A pair of vertically spaced feed rolls 30 and 31 are positioned at the left-hand end of table 29. Rolls 30 and 31 are vertically spaced with their axes horizontally aligned, and are in peripheral contact with each other. Rolls 30 and 31, as well as rolls 13 and 14, 16 and 17, 27 and 28 are adapted to be power driven at synchronized speeds, such as by an electric motor (not shown), and are thereby adapted to feed the cloth 19 through the tank 11, tower 24 and out upon the top of table 29.

On table 29 the impregnated cloth 20 is cut into suitable shapes, such as rectangles or the like, as desired. The cut shapes are then transferred to a mold for curing, and as shown in FIG. 2 at 32, there is indicated a corrugated mold comprised of mating upper and lower mold sections 33 and 34. Configuration of the mold sections 33 and 34 is best shown in the section view of FIG. 3. Each of the mold sections 33 and 34 is built up from a number of individual mold segments 35 which are comprised of a concave curved section 36 and a pair of depending arm members 37. Apertures are formed at spaced intervals in arms 37, and bolts 38 are inserted in said apertures, with the segments 35 aligned, to secure the same in aligned relation. Segments 35 in each mold section 33 and 34 are identical, being suitably fabricated by extrusion from aluminum or other light-weight metal. A single extrusion die is employed for economy in fabricating segments 35. Since the curves 36 of segments 35 are identical, the upper and lower mold sections 33 and 34 are made slightly wider than necessary to allow for an offset to make the curves match, as shown in FIG. 2.

The upper mold section 33 is removed for positioning of the impregnated cloth 20 thereon. The cloth 20 is manually pressed into the corrugations of the lower mold section 34 and then the upper mold section 33 is laid in place. Weights are then positioned on top of upper mold section 33 to provide even pressure on the impregnated cloth 20 during the curing operation. Such weights may be in the form of iron pipes 40 or steel rods or the like.

A roll conveyor is shown at 41 and includes a frame 42 comprising channel members 43 supported on legs 44. Rolls 45 are journaled between members 43 and are adapted to roll the mold 32 into and through an oven 46 where the mold and resin impregnated cloth are heated to thereby cure the resin to a hard, solid state.

Resins applicable to use in the present invention include polyesters, such as those made by the interaction of a polybasic acid or an anhydride of such acid with a polyhydric alcohol. Any desired combination of polybasic acid or anhydride and polyhydric alcohol may be used. For example, unsaturated dibasic acids such as maleic, fumaric, itaconic, citraconic, mesaconic and the like are applicable. Also the saturated dibasic acids such as succinic, adipic, sebacic and the like, and the aromatic acids such as phthalic acid and phthalic anhydride are applicable. The dihydric alcohols include polymethylene glycol in the series from ethylene glycol to decamethylene glycol, propylene glycol, and butylene glycol, any polyethylene glycol in the series from diethylene glycol to nonaethylene glycol, dipropylene glycol, and glycerol monobasic acid monoester (either in the alpha or beta position), such as monoformen or monoacetin, any monoether of glycerol with a monohydric alcohol such as monomethylin or monoethylin, or any dihydroxy alkane in which the alcohol radicals are primary or secondary or both, in the series from dihydroxy butane to dihydroxy decane.

Further discussion of polyester resins is found in U.S. Patent No. 2,462,042, dated February 15, 1949, to A. M. Howald et al., to which reference is made.

A product obtained by the hardening of a composition in which an unsaturated polyester is the only polymerizable component is generally lacking in water resistance and hardness. By addition of a liquid monomeric polymerizable compound to the unsaturated polyester and then copolymerizing the two materials, a product is produced which has improved water resistance and improved hardness. Accordingly, it is desirable in the process of the present invention to add a monomeric material such as styrene or the like. Such monomeric material serves a dual purpose. In addition to providing a more water resistant finished product, it serves to lower the viscosity of the liquid 12 in tank 11 and thus facilitate the coating of the cloth 19 as well as the wringing of excess resin from the impregnated cloth 20. Also since the styrene is copolymerized with the polyester and becomes an integral part of the finished product, the solvent removal problem in the drying tower 24 can be substantially eliminated.

The viscosity of resin 12 in tank 11 is adjusted by means of a suitable solvent or liquid, monomeric material such as styrene, to a point where only the cords of the cloth are saturated, thereby leaving the interstices of the cloth open as described hereinbelow. A satisfactory viscosity of operation will be in the range from 200 to 600 centipoises with a viscosity in the range from 500 to 600 centipoises preferred. In any event the viscosity is maintained at a level where the resin will not bridge the interstices between the cords of the cloth.

The cloth 19 may consist of a fabric sheet woven from one or more of a number of substances including synthetic and vegetable fibers such as, for example, glass, nylon, rayon, cellulose, and the like, or burlap as commonly produced from jute, flax, hemp or manila fibers. Experience to date has indicated that glass cloth has produced the optimum results, which will therefore be described herein by way of illustration.

In order to produce the desired textured pattern in the finished panel, it has been found that the woven material should conform to a number of well-defined requirements. First, the fibers forming the cloth are preferably of a denier referred to as 75s, 150s, 450s or the like. As known in the trade, glass fibers designated as 75s comprise 7,500 yards per pound (fiber diameter about 0.0005"); 150s comprise 15,000 yards per pound (fiber diameter about 0.00036"); and 450s refer to fibers which comprise 45,000 yards per pound (fiber diameter about 0.00021"). Other commonly employed glass fibers are 225s and 900s and the production of certain products may include their employment.

In addition to fiber denier or diameter, it has been found that the type of weave which is used in the cloth 19 bears importantly on texture and finished appearance of the panel products of the present invention. To illustrate, those weaves referred to in the textile industry as special open weaves are most suitable. It has been further found important that the fabric have a particular construction. To elaborate, experience indicates that the cloth 19 should have a thickness of at least about 0.008 inch, which may range upwards to about 0.050 inch or higher. In addition, in order to accomplish the "texturized" finish without a sacrifice in strength, the number of warp strands per inch should preferably be in the range from 12 to 60 inclusive and the number of fill or weft strands per inch should be in the range from 12 to 40 inclusive.

It has also been noted that the yarn count has a bearing upon the appearance of the finished panel. In the glass fiber art, yarn count is designated in the form of a fraction in which the numerator indicates the number of original strands twisted and the denominator, the number of strands which have been plied. To illustrate, a yarn count of 1/0 indicates that a single original strand has been given a twist and has not been plied, while a yarn count of 4/5 designates that four strands have been twisted and that five of these twisted strands have been plied.

In accordance with the present invention it has been found that the most desirable results by way of texture are obtained when the product of the numerator and denominator in the yarn count is between 6 and 12, which may be obtained for example, by employing yarns having a count of 2/3 up to 3/4 or 2/6. However, it is of course possible to produce an effective panel in which the product of the yarn count numerator and denominator varies slightly from the noted range of 6–12, by varying the type of weave and the number of warp ends and weft fills per inch. In the majority of instances, however, the most satisfactory results will be found by remaining within the preferred range.

One suitable woven glass cloth material is illustrated in FIG. 4, wherein the warp 47 has been illustrated as running horizontally and the weft or fill 48 running in a vertical direction. As thus constructed and arranged, it will be seen that the warp is composed of four strands or yarns 49, 50, 51 and 52 and the weft of three strands or yarns 53, 54 and 55. Upon examination of the actual fabric employed, the sett of the fabric or number of warp and weft threads per lineal inch is ten warp cords each designated 56, or 40 yarns or ends per inch in the warp. The weft 48, on the other hand, is composed of eight cords 57, or 24 yarns or ends per inch. The fabric is therefore designated in the art as having a 40 by 24 sett. In this particular material, interstices 58, between the warp and weft cords are approximately $\frac{1}{32}$ by $\frac{1}{16}$" in size.

A panel 59, in which resin 12 is the impregnant in an open weave cloth 19 of the type described above, is illustrated in the 4X enlarged plan view of FIG. 5. The panel 59 has a relatively uneven surface on the top and bottom thereof caused by the weave of the cloth 19 and resin 12 contained in the cloth, the intersections of the cloth being filled with resin as are the cords extending between the intersections. Specifically, it will be noted in FIG. 5 that there are a plurality of interstices 58 left in the cloth between the intersections of the yarns, which interstices are unbridged by resin. These interstices 58 are of uniform spacing and are of uniform size throughout the length and breadth of the cloth to thereby impart a pleasant decorative effect to the product.

Although other types of weaves productive of the desired results will be apparent to those skilled in the art, in the selected mock leno weave, the particular arrangement or interlacing of the warp and weft threads contributes a pleasant, decorative texture to the finished panel 59. It will thus be noted, re FIG. 4, that weft threads 53 and 55 pass under warp threads 49 and 52 in one row of the warp 47 and at the same intersection over warp threads 50 and 51. It will also be noted that weft thread 54 alternately passes completely over and then under all of the warp threads 49, 50, 51 and 52. In the next warp row it is to be observed that the interlacings of the weft threads 53 and 55 has been reversed with respect to the warp threads. That is to say, in the next warp row weft threads 53 and 55 pass under warp threads 50 and 51 and over warp threads 49 and 52. The odd weft thread 54, in this row passing completely under all four warp threads.

The particular woven pattern above described repeats itself throughout the fabric to provide substantially rectangular interstices 58 over the entire width and length of the cloth 19, as well as warp cords 56 and weft cords 57 of substantially uniform width throughout either the warp 47 or weft 48 to provide a uniform checkered pattern throughout the finished article.

In order to emphasize the presence of a uniformly woven structure within the synthetic resin 12 and thus to render its texture more easily discernible, it has been found desirable that the woven material 19, especially glass cloth, be treated in a manner whereby it does not become transparent in the presence of the resin. This is preferably done during the process of manufacturing glass fibers by applying a size thereto. However, substantially the same result may also be accomplished by applying a finish and/or dye to the glass fabric during or after the weaving process. Sizing materials may include aqueous emulsions of starch, urea formaldehyde, methyl methacrylate, melamine formaldehyde, or pigmented sizes or finishes of other types which are of a nature that they preserve the appearance of the strands after the impregnation in the resin.

While the mold shown in the drawings is adapted to the production of panels 59 having a corrugated cross-section, it will be appreciated that the present invention is also applicable to panels of other cross sections, as well as to substantially flat panels.

The panel products of the present invention are adapted to a variety of uses including interior wall coverings, simulated draperies and others for public halls, theaters and the like. These products are characterized by a pleasant decorative appearance as well as good acoustical properties due to their foraminous structure. The present panels may be decorated in a suitable manner such as by having designs stenciled or printed thereon.

It is to be considered within the scope of the present invention to employ panels made in the manner described in fabricating acoustic linings for buildings, for vehicles such as aircraft and automobiles, and the like. Such acoustical panels are made either as a two or three layer sandwich having as an outer layer a panel of the present invention, a middle layer of suitable sound absorption material such as extremely fine glass fibers, and, if desirable, another cover layer comprising a panel of the present invention. This composite product is in effect a mat of sound absorption material having one or both of its exposed faces covered with panel materials of the present invention. In those instances wherein both surfaces of the panel are not exposed to view, it will be desirable, of course, to have only one face of the sound absorption mat covered with the present panels, for greatest economy. Fabrication of sound absorbing units in this fashion can be readily effected by placing a panel on a support surface, coating a surface of the panel with an adhesive, and manually or mechanically applying a sound absorptive mat material thereto as by pressing or the like.

Figure 7:
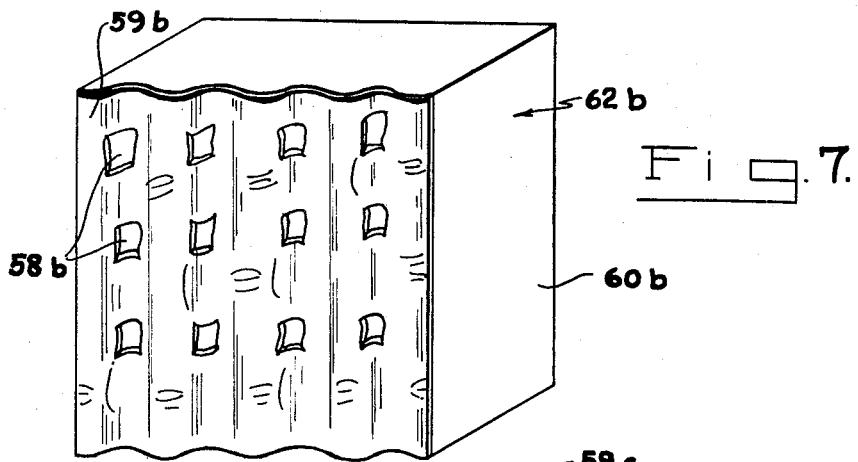
FIG. 7 is an enlarged pictorial representation of a modified acoustical unit having a corrugated facing cover similar in all respects other than its shape to the facing cover of FIG. 6.
Figure 8:
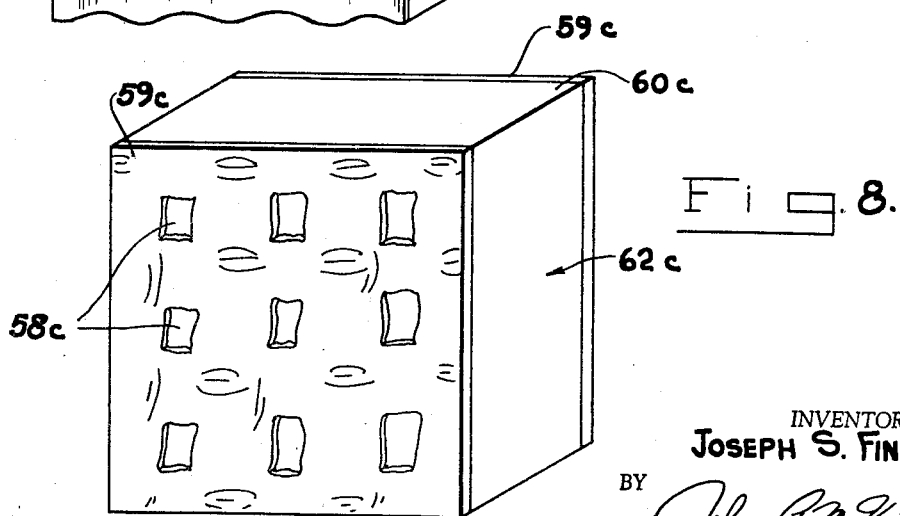
FIG. 8 is an enlarged pictorial representation of a typical acoustical unit having a facing cover on both the front and back of an acoustical mat.

Referring to FIGS. 6, 7 and 8, several of such acoustical panels are illustrated therein. In FIG. 6, an acoustical panel 62 has a relatively planar facing 59a, fabricated according to the precepts of the present invention, attached to a layer of sound absorbing material 60. The open interstices 58a permit sound waves to encounter the layer of sound absorbing material 60 and to be absorbed thereby.

In FIG. 7, the acoustical panel 62b is somewhat similar to that illustrated in FIG. 6, except that the facing 59b is of the corrugated type. Open interstices 58b permit sound waves to pass through the facing to be absorbed by the absorbing material 60b.

The panels of FIGS. 6 and 7 are supported by conventional support means, well known in the art. The panels are ordinarily juxtapositioned to each other, with the facings 59a or 59b being exposed to view.

Referring to FIG. 8, the drapery type of acoustical panel 62c has a facing 59c on each major face of a layer of acoustical material 60c. Open interstices 58c in each facing permit the sound waves to pass therethrough and into the sound absorbing material.

Acoustical panels made in this manner are characterized by a number of obvious advantages. They are self-sustaining, i.e., they may be suspended at their top edges in vertical fashion as draperies, and due to the inherent strength of the glass cloth core of the panels, will require no further support. Being essentially comprised of glass, the acoustical panels are highly resistant to deterioration by moisture, fire or fungi.

When it is desired to apply such acoustic panels to wall surfaces, ceilings or others, conventional adhesives or mechanical fasteners may be employed in a manner known in the art.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. An acoustical panel unit comprising a mat of sound absorbing material, said mat having a front and back face, and a panel covering the front face of the mat, the panel comprising a woven cloth core, and rows of warp threads and the rows of weft threads which intersect in the cloth being separated to provide the cloth with a plurality of interstices, the threads being impregnated and covered by cured thermosetting resin, the resin bridging the warp and weft threads at the intersections thereof to form a continuous, relatively uneven surface on the portions of the panel overlying the threads, substantial portions of the interstices remaining open to provide the panel with a plurality of openings, whereby sound waves can pass through the panel openings and into the sound absorbing mat.

2. An acoustical panel unit as recited in claim 1, wherein the threads of the woven cloth core are comprised of glass fibers.

3. An acoustical panel unit as recited in claim 2, wherein the mat of sound absorbing material is formed of glass fibers.

References Cited in the file of this patent

UNITED STATES PATENTS

| | | |
|---|---|---|
| 1,609,937 | Forrest | Dec. 7, 1926 |
| 1,730,529 | Robbins | Oct. 8, 1929 |
| 1,785,507 | Weiss | Dec. 16, 1930 |
| 2,050,156 | Borghetty | Aug. 4, 1936 |
| 2,355,608 | Stieger | Aug. 15, 1944 |
| 2,462,042 | Howald et al. | Feb. 15, 1949 |
| 2,514,170 | Walter et al. | July 4, 1950 |
| 2,720,076 | Sachara | Oct. 11, 1955 |
| 2,769,222 | Southwell | Nov. 6, 1956 |
| 2,771,659 | Ball | Nov. 27, 1956 |
| 2,948,950 | Finger et al. | Aug. 16, 1960 |

FOREIGN PATENTS

| | | |
|---|---|---|
| 482,809 | Great Britain | Apr. 5, 1938 |